2,842,936

ROCKET PROPELLANTS AND THEIR UTILIZATION

Arnold L. Ayers, Idaho Falls, Idaho, and Cleveland R. Scott, Bartlesville, Okla., assignors to Phillips Petroleum Company, a corporation of Delaware No Drawing. Application May 9, 1952
Serial No. 287,028

17 Claims. (Cl. 60—35.4)

This invention relates to rocket propellants. In one embodiment this invention relates to hypergolic fuels and their application to the propulsion of rockets.

Our invention is concerned with new and novel rocket propellants and their utilization; a rocket or jet propulsion device, being defined herein as a rigid container for matter and energy so arranged that a portion of the matter can absorb the energy in kinetic form and subsequently be ejected in a specified direction. The type rocket to which our invention is applied is that type of jet propulsion device designated as a "pure" rocket, i. e., a thrust producer which does not make use of the surrounding atmosphere. A rocket of the type with which our invention is concerned is propelled by introduction of a propellant material into a combustion chamber therein, and burning it under conditions that will cause it to release energy at a high but controllable rate immediately after entry into the combustion chamber. Rocket propellants, as liquids, are advantageously utilized inasmuch as liquid propellant materials can be carried in a light weight low pressure vessel and pumped into the combustion chamber, the latter though it must withstand high pressure and temperature, being only necessarily large enough to insure combustion. Secondly, the flow of liquid propellant into the combustion chamber can be regulated at will so that the thrust, continuous or in intermittent bursts of power, can be sustained, the latter type of liquid propellant flow contributing to a long life of the combustion chamber and thrust nozzle.

Various liquids and liquid combinations have been found useful as rocket propellants. Some propellants consist of a single liquid, and are termed "monopropellants." Those propellants involving two liquids are termed "bipropellants" and normally consist of an oxidizer and a fuel. Hydrogen peroxide and nitromethane are each well known monopropellants. Well known bipropellants include hydrogen peroxide or liquid oxygen as the oxidants, with a fuel component such as ethyl alcohol-water, ammonia, hydrazine, or hydrogen; and nitric acid as the oxidizer with aniline or furfural alcohol as hypergolic bipropellant fuel components.

When employing 90–100 percent nitric acid, i. e., "white fuming nitric acid" as the oxidizer in a rocket bipropellant, it is often necessary, dependent on the specific fuel component, to make ignition more prompt by dissolving from 6 to 14 percent of nitrogen dioxide in the white fuming nitric acid forming thereby "red fuming" nitric acid. A fuel component of a bipropellant material of the type described herein, is spontaneously ignited upon contacting the oxidizer, and for that reason is referred to herein as being "hypergolic." A ratio of oxidizer to hypergolic fuel based on stoichiometric amounts can be utilized, within the limits of 0.5:1 to 1.5:1 if desired, the efficiency of the combustion being less at ratios below 1:1, and the use of the oxidizer being less economical at ratios above 1:1. However, practical considerations may necessitate the use of higher ranges, even as high as 6:1.

An object of this invention is to provide new rocket propellants. Another object is to provide a method for producing thrust to a rocket. Another object is to provide new hypergolic fuels. Another object is to provide fuels that are hypergolic even when diluted with non-hypergolic combustible materials. Another object is to provide fuels that are hypergolic when contacted with white fuming nitric acid. Another object is to provide fuels that are hypergolic when contacted with red fuming nitric acid. Another object is to provide a group of conjugated diene monomers, and polymers of such dienes as new hypergolic fuels. Another object is to provide 1,3-butadiene, 2-methyl-1,3-butadiene, 1,3-pentadiene and selected liquid polymers of 1,3-butadiene as a preferred group of new hypergolic fuels. Other objects will be apparent to those skilled in the art in the light of the accompanying discussion and disclosure.

In accordance with our invention we have provided rocket bipropellant materials, the fuel components of which are selected from at least one of the group consisting of (1) a conjugated diene characterized by the structural formula.

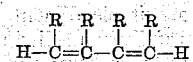

wherein one R is a radical selected from the group consisting of H, phenyl, substituted alkyl, substituted phenyl, alkoxy, NO$_2$, and each remaining R is selected from the group consisting of H, and an alkyl group containing not more than 4 carbon atoms, the maximum number of carbon atoms in the total R's not exceeding 12, and (2) a liquid open-chain polymer of said conjugated diene characterized by a viscosity at 100° F. generally from 5 to 10,000 Saybolt Furol seconds, and a molecular weight generally within the limits of from 200 to 10,000 as determined by the freezing point lowering of benzene.

The fuel components of our invention are hypergolic alone and also when diluted with non-hypergolic combustible materials such as n-heptane, hydrocarbons boiling in the gasoline range, kerosene, isooctane, diisobutylene, methylcyclohexane, benzene, toluene, and the like; our hypergolic fuel components retain their hypergolicity when red or white fuming nitric acid is used as the oxidant, in dilutions containing as high as 60 percent of the non-hypergolic diluent, and in some instances higher.

Any known oxidizer components may be used in the bipropellants of our invention, particularly other oxidants such as hydrogen peroxide, liquid oxygen, and mixed acids, particularly mixtures of nitric and sulfuric acids.

Further illustrative of the hypergolic fuels of our invention are 1-tolyl-1,3-butadiene, 1-isopropylphenyl-1,3-butadiene, 2-ethylphenyl-1,3-pentadiene, 2-ethoxy-1,3-pentadiene, 3-nitro-1,3-hexadiene, 2,4-heptadiene, 2,3-dimethyl-1,3-butadiene, 2,4-octadiene, 3-butoxy-2,5-hexadiene, 1-nitro-2-ethyl-1,3-pentadiene, 2-methyl-3-ethyl-1,3-hexadiene, 1-methoxy-1,3-pentadiene, 3-propoxy-2,4-heptadiene, 3-5-decadiene, 5,7-dodecadiene, 1-phenyl-3,5-octadiene, and 3(2-oxabutyl)-1,3-hexadiene.

We particularly prefer to employ as hypergolic fuels in accordance with our invention, materials selected from the group consisting of 1,3-butadiene, 2-methyl-1,3-butadiene, 1,3-pentadiene, and a liquid polymer of 1,3-butadiene free from solid polymers and having a viscosity within the limits of 5 and 6000 SFS as measured at 100° F.

1,3-butadiene, 2,3-dimethyl-1,3-butadiene, and 1,3-pentadiene are produced by various known methods as for example by hydrocarbon cracking and are generally present as by-products in various hydrocarbon cracking processes in particular directed toward the production of dienes. One well known method for the preparation of 1,3-butadiene involves the dehydrogenation of n-butane to produce butenes followed by dehydrogenation of the butene product to form the 1,3-butadiene.

The liquid diolefin polymer employed as a hypergolic fuel in accordance with our invention is not a rubber-like synthetic polymer, but rather it is a liquid and is characterized by the viscosity and molecular weight limitation already described. The liquid polydiene fuel component of our invention can be prepared in any desired manner. For example, such a liquid polymer can be prepared from 1,3-butadiene by emulsion polymerization of 1,3-butadiene in the presence of a sufficiently large amount of modifier, such as 3 to 10 parts by weight of an alkyl mercaptan per 100 parts of the butadiene monomer to be polymerized, or it may be prepared by bulk or homogeneous polymerization of the diene monomer in the presence of a finely divided alkali metal catalyst and a modifying solvent. One such method is disclosed in application Serial No. 67,098, W. W. Crouch, filed December 23, 1948, now Patent 2,631,175, issued March 10, 1953. In accordance with the procedure referred to in that copending application, the preparation in a preferred modification comprises the steps (1) removal of deleterious materials from the diene monomer feed, (2) polymerization of the diene in the presence of an alkali metal catalyst and a suitable diluent, the reaction being carried out under carefully controlled reaction conditions, particularly temperature, catalyst condition and concentration, quantity of solvent and rate of addition of the monomeric diene to the polymerization zone, and (3) recovery of the liquid diene polymer so produced. When conducting the polymerization in this manner a polymer is produced comprising a substantially colorless transparent liquid having a viscosity not exceeding 10,000 Saybolt Furol seconds at 100° F. and a molecular weight within the limits of 200 and 10,000 as determined in accordance with the freezing point lowering method employing benzene.

The double bonds of the liquid polymer thus produced are of such a nature that they do not react completely under conditions ordinarily used for iodine number determinations and therefore this method for determining unsaturation is not reliable. However, the unsaturation has been determined by an iodine monochloride method which gives more significant results. For example, a molecular weight of a given sample of liquid polybutadiene of 2000 was assumed, and the unsaturation was found to be in the neighborhood of about 30 double bonds per molecule. This is equivalent to an iodine number of about 371. Stated in a different way, that polymer on this basis was calculated to contain 0.79 double bonds per butadiene unit.

The advantages of this invention are illustrated in the following examples. The reactants and their proportions and their specific ingredients are presented as being typical and should not be construed to limit the invention unduly.

Example I

Each of the conjugated diolefins described hereinbelow was tested at room temperature for spontaneous ignition, employing nitric acid as the oxidizer. In conducting these tests 0.13 ml. of a mixture (with one exception) of the conjugated diolefin and pure grade n-heptane was dropped into a 1″ x 8″ test tube containing 0.3 ml. of either red or white fuming nitric acid. The diolefin and the nitric acid, in each test, ignited spontaneously upon coming in contact with each other in the test tube. The pure grade n-heptane was employed to determine the maximum amount of dilution that such a diolefin would tolerate and still retain its hypergolicity. Results of tests using 1,3-butadiene, 2-methyl-1,3-butadiene and 1,3-pentadiene are recorded in the following table.

| Compound | Oxidant | Maximum Dilution, Percent n-Heptane |
| --- | --- | --- |
| 1,3-butadiene | Red Fuming Nitric Acid | Ignition.[1] |
| Do | White Fuming Nitric Acid | Do.[1] |
| 2-methyl-1,3-butadiene | Red Fuming Nitric Acid | 20. |
| Do | White Fuming Nitric Acid | 10. |
| 1,3-pentadiene | Red Fuming Nitric Acid | 30. |
| Do | White Fuming Nitric Acid | 10. |

[1] Dilution was not attempted due to the difficulty of handling the low boiling 1,3-butadiene.

Example II 1,3-butadiene and 2-methyl-1,3-butadiene were tested in accordance with the procedure of Example I, except that a diluent was not employed, and the tests were carried out at −40° F. Results of these tests are tabulated as follows:

| Compound | Oxidant | Diluent | Result |
| --- | --- | --- | --- |
| 1,3-butadiene | Red Fuming Nitric Acid | None | Ignition. |
| 2-methyl-1,3-butadiene | do | do | Do. |

Example II

A sample of liquid polybutadiene was prepare by the batch polymerization of 1,3-butadiene as a 30 to 40 weight percent mixture of butadiene in n-heptane employing a 1.25 weight percent suspension of sodium in finely divided form, sometimes referred to as sodium sand, in xylene as catalyst. Polymerization was effected at 200–205° F. for three hours. The catalyst was inactivated by addition of methanol and the polymer solution treated with dilute sulfuric acid and washed to remove sodium residues. The polymer was recovered by removing the solvent by distillation. The polymer had the following physical properties and analysis:

Viscosity, Saybolt Furol seconds at 100° F_____ 435
Gardner color _____ 10
Specific gravity, 60/60° F_____ 0.9097
Refractive index, 68° F_____ 1.5200
Flash point, Cleveland open cup method___° F__ 280
Ash, weight percent_____ 0.013
Volatiles, weight percent_____ 0.87

This liquid polybutadiene was found to be hypergolic in the presence of both red and white fuming nitric acids. Results are recorded below.

| Compound | Oxidant | Maximum Dilution, Percent n-Heptane |
| --- | --- | --- |
| Liquid polybutadiene | White Fuming Nitric Acid | 60 |
| Do | Red Fuming Nitric Acid | 40 |

Example IV 2-methoxy butadiene was tested for spontaneous ignition employing both white fuming nitric acid and red fuming nitric acid, as the oxidizer. These tests were conducted in accordance with the test procedure of Example I, at both −40° F. and at room temperature (about 70° F.). Results of these tests are tabulated as follows:

| Temperature | Oxidant | Maximum Dilution, Percent n-Heptane |
| --- | --- | --- |
| Room | Red fuming nitric acid | 30 |
| Do | White fuming nitric acid | 30 |
| −40° F | Red fuming nitric acid | 10 |
| −40° F | White fuming nitric acid | 10 |

It is within the scope of our invention to employ ignition catalysts with our hypergolic compounds, if desired.

As an added feature of this invention the bipropellant fuel components described hereinabove are also useful for providing fast burning fuels suitable for use in rocket engines and the like where a hypergolic fuel is not necessarily required. For example, a fuel component of this invention dissolved in a liquid hydrocarbon, such as a gasoline, a jet fuel, a kerosene, a naphtha, or a petroleum fraction having a boiling point usually not greater than 800° F., even if the resulting solution is not hyperoglic with an oxidant such as fuming nitric acid, can be used together with an oxidant and a suitable ignitor as a rocket propellant. These fast burning fuels are particularly useful if for various reasons a hypergolic fuel is not desired or required. The fuel components described, may be added to a hydrocarbon liquid in a minor amount, usually from about 1 to 20 percent by volume of the total admixture to produce fast burning fuels. Suitable fuels are 1-20 percent by volume of the selected fuel component and 80-99 percent by volume of a petroleum fraction of the type described above, often a normally liquid hydrocarbon mixture boiling up to an end point of about 425° F., i. e. a gasoline fraction.

Variation and modification are possible within the scope of the foregoing disclosure and the impended claims to the invention, the essence of which is that certain conjugated dienes, and liquid polymers of such conjugated dienes have been found to be hypergolic, and to be useful for providing fast burning fuels suitable for use in rocket engines.

We claim:

1. A method for producing immediate thrust to a rocket, comprising introducing oxidizer and fuel of a bipropellant into said rocket in contact with each other in a combustion zone therein in proportions so that spontaneous ignition is effected and burning said fuel in said rocket, said fuel comprising at least one fuel component selected from the group consisting of (1) a conjugated diene characterized by the structural formula

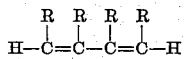

wherein one R is a radical selected from the group consisting of H, phenyl, alkoxy, NO$_2$, and each remaining R is selected from the group consisting of H, and an alkyl radical containing not more than 4 carbon atoms, the maximum number of carbon atoms in the total R's not exceeding 12, and (2) a liquid polymer of said conjugated diene and characterized by a viscosity at 100° F. of from 5 to 10,000 Saybolt Furol seconds, and a molecular weight within the range of from 200 to 10,000 as determined by the freezing point lowering of benzene.

2. The method of claim 1 wherein the stoichiometric ratio of oxidizer to hypergolic fuel is within the limits of 0.5:1 to 1.5:1.

3. A method for producing immediate thrust to a rocket, comprising introducing oxidizer and fuel of a bipropellant into said rocket in contact with each other in a combustion zone therein in proportions so that spontaneous ignition is effected and burning said fuel in said rocket, said fuel comprising 1,3-butadiene.

4. The method of claim 1 wherein said fuel component is 2-methyl-1,3-butadiene.

5. The method of claim 1 wherein said fuel compoent is 1,3-pentadiene.

6. The method of claim 1 wherein said fuel component is a liquid polybutadiene characterized by a viscosity within the limits of 5 and 6,000 SFS at 100° F.

7. A method for producing immediate thrust to a rocket, comprising introducing an oxidizer, which oxidizer is capable of causing spontaneous ignition upon contact with a hypergolic fuel, and a fast burning fuel into said rocket in a combustion zone therein in contact with each other, the stoichiometric ratio of oxidizer to fuel being within the limits from 0.5:1 to 6:1, and burning said fuel in said rocket with said oxidizer at a high but controllable rate, said fuel containing from 1 to 100 percent of a component which is hypergolic in the pure state when contacted with said oxidizer, said component being an essential ingredient for imparting said fast burning quality to said fuel by its presence therein, said component being at least one of the materials selected from the group consisting of (1) a conjugated diene characterized by the structural formula

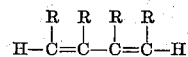

wherein one R is a radical selected from the group consisting of H, phenyl, alkoxy, NO$_2$, and each remaining R is selected from the group consisting of H, and an alkyl radical containing not more than 4 carbon atoms, the maximum number of carbon atoms in the total R's not exceeding 12, and (2) a liquid polymer of said conjugated diene and characterized by a viscosity at 100° F. of from 5 to 10,000 Saybolt Furol seconds, and a molecular weight within the range of from 200 to 10,000 as determined by the freezing point lowering of benzene.

8. A method of claim 7 wherein said fuel contains a combustible liquid hydrocarbon fuel material, which material is not capable of spontaneous ignition in the pure state when contacted with said oxidizer, as a diluent for said hypergolic component, said material being present in such an amount relative to said hypergolic component that said fuel is not capable of spontaneous ignition upuon contact with said oxidizer.

9. A method of claim 1 wherein said fuel contains a combustible liquid hydrocarbon diluent, which material is not capable of spontaneous ignition in the pure state upon contact with said oxidizer, said diluent being present in an amount permitting said spontaneous ignition to be effected.

10. A method of claim 8 wherein said liquid hydrocarbon is a n-paraffin.

11. A method of claim 8 wherein said liquid hydrocarbon is benzene.

12. A method of claim 9 wherein said liquid hydrocarbon is a n-paraffin.

13. A method of claim 9 wherein said liquid hydrocarbon is benzene.

14. The method of claim 8, wherein said fuel contains from 1 to 20 volume percent of said component.

15. The method of claim 14, wherein said component is a liquid polybutadiene characterized by a viscosity within the limits of 5 and 6000 SFS at 100° F.

16. The method of claim 8, wherein said component is a conjugated diolefin.

17. In a method for rocket propulsion, the step of supplying as an essential ingredient of a rocket propellant at least one compound selected from the group consisting of (1) a conjugated diene characterized by the structural formula

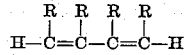

wherein one R is a radical selected from the group consisting of H, phenyl, alkoxy, NO$_2$, and each remaining R is selected from the group consisting of H, and an alkyl containing not more than 4 carbon atoms, the maximum number of carbon atoms in the total R's not exceeding 12, and (2) a liquid polymer of said conjugated diene and characterized by a viscosity at 100° F. of from 5 to 10,000 SFS, and a molecular weight within the range of from 200 to 10,000 as determined by the freezing point lowering of benzene, said essential ingredient comprising from 1 to 100 percent of the combustible fuel present in said rocket propellant, and burning said compound in a combustion zone of said rocket with an oxidizer, said oxidizer being capable of causing spontaneous ignition upon contact with a hypergolic fuel in the pure state, the stoichiometric ratio of said oxidizer to combustible fuel in said rocket propellant being in the range from 0.5:1 to 6:1.

References Cited in the file of this patent

UNITED STATES PATENTS

| 1,994,249 | Ipatieff et al. | Mar. 12, 1935 |
| 2,360,272 | Plummer | Oct. 10, 1944 |
| 2,573,471 | Malina et al. | Oct. 30, 1951 |
| 2,631,175 | Crouch | Mar. 10, 1953 |
| 2,712,497 | Fox et al. | July 5, 1955 |

OTHER REFERENCES

Trent et al.: Journal of the Am. Rocket Soc., vol. 21, September 1951, pages 128–131.

Leonard: Jour. of the Am. Rocket Soc., vol. 72, December 1947, page 21.